Patented Nov. 10, 1925.

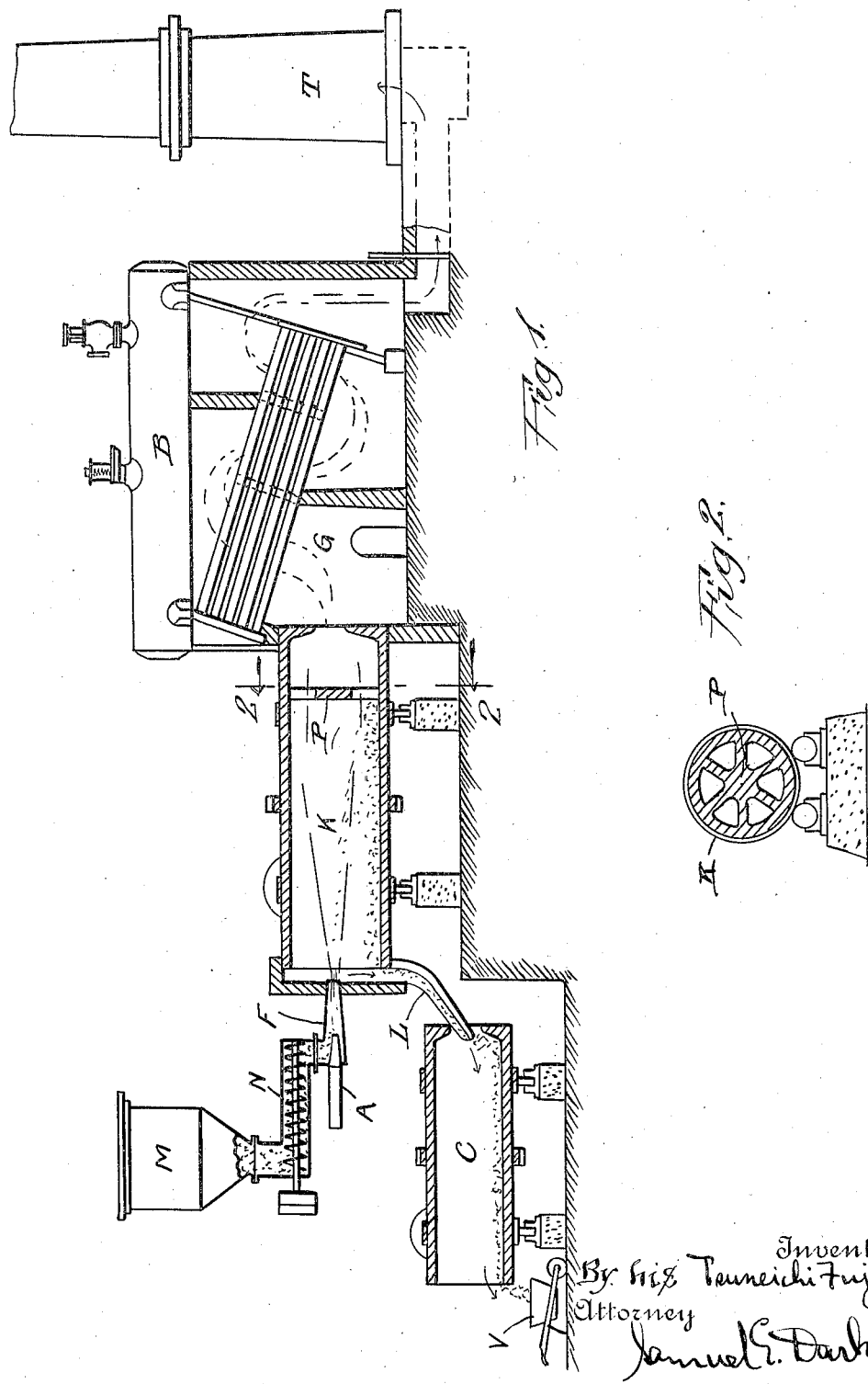

1,561,070

UNITED STATES PATENT OFFICE.

TSUNEICHI FUJIYAMA, OF TOKYO, JAPAN.

PROCESS OF AND APPARATUS FOR PRODUCING CEMENT.

Application filed May 25, 1920. Serial No. 384,114.

*To all whom it may concern:*

Be it known that TSUNEICHI FUJIYAMA, a subject of the Emperor of Japan, residing at 116 Aoyama-minami-machi Rokuchome, Akasaka-ku, Tokyo, Japan, has invented certain new and useful Improvements in Processes of and Apparatus for Producing Cement, of which the following is a specification.

This invention relates to a method of and apparatus for the combustion of powdered fuels and includes subjecting fuels in a pulverized state to combustion in the presence of a pulverized compound with which are combined the solid products of combustion. The invention is characterized by the fact that, when pulverized or powdered fuels are ignited under air blast, a quantity of lime, or some equivalent mineral substance will combine with the ashy contents of the fuels and form a cement clinker similar to Portland cement.

The object of the present invention therefore includes the steps of providing for the ashy contents of the fuel in the formation of valuable by-products and at the same time increasing the heating efficiency of the pulverized or powdered fuels used and thereby avoiding, to a great extent, the attending mechanical and chemical difficulties incident with high temperature combustion and due to the ashy matters contained in the fuels used. It is well known that the ashy matters incident with the combustion of pulverized fuels are in the form of a fine dust and scatter about and stick to the walls of the heater, or come in contact with heated matters, and thereby, mechanically or chemically, produce injurious results.

Since the ashy substance is mainly composed of aluminum silicate and oxide of iron, it is, in composition, similar to the mineral substance hitherto used as the raw material in the manufacture of Portland cement. When now this substance is mixed, as in the present invention, with an adequate quantity of lime, or other equivalent substance, these, due to the high heat caused by the combustion, will chemically unite to produce cement clinkers. Moreover by this method, the intensity of heat may be softened, and consequently various hindrances will desirably be avoided.

Due to the high heat caused by the combustion of the fuel, the ashy matter will chemically combine with the limy substance to form cement clinkers, so that a great proportion of the ashy matters liberated in the chamber K will be arrested or collected therein and converted into a useful by-product.

As an example for carrying my invention into effect, I proceed as follows, reference being had to the accompanying drawing in which Fig. 1 is an elevation partly in section, and Fig. 2 is a section taken on lines 2—2 of Fig. 1. In a combustion apparatus in which pulverized or powdered fuels are used, a chamber K for collecting ashy matters is provided between the burner F and the heater G. In a fuel tank or hopper M a quantity of lime or other equivalent mineral substance, proportionate to the quantity of the ashy matters contained in the fuels, is previously put to be mixed together with the selected fuel and then fed by a suitable conveyor to the burner F to be mixed therein with the fuel which is fed through a proper conductor A.

The mixture is fed by an accompanying air blast which forces the material through the burner F where it undergoes combustion, and the ashy matters, chemically combine with lime and some other substances in the collecting chamber K. This chamber is inclined toward its discharge chute L and rotates continuously and the clinkers come down from one side to the other and are gradually carried through a chute L into a cooling chamber C. This chamber is open at one end and as it also rotates the material is gradually cooled and caused to be ejected into a conveyor V. The flame and hot blast pass through the collecting chamber into the heater G to the boiler B and thereafter pass out through the chimney T. The chamber K is provided with a baffle-plate P to stop the solid or ashy matter from traveling to the boiler, and both chamber K and cooling cylinder C are mounted to rotate and are inclined to aid the material to discharge more readily.

I claim:

1. The method of obtaining a cement compound free products of combustion which comprises causing powdered fuel to be ignited in the presence of lime to form solid products and heated gases, and causing the products and heated gases to move in the same direction, then causing said solid products and heated gases to be separated and moved in opposite directions to permit the solid product to be collected and the heat units of the gases to be advantageously utilized.

2. An apparatus for effecting combustion of finely pulverized fuels whereby a high temperature is obtained and a cement clinker is formed from the resulting ashy content of said fuel and a mineral, comprising a cooling chamber, a rotating combustion chamber open at both ends and having a baffle near one end thereof, a fuel feed associated with a mineral supplying hopper for mixing said fuel and mineral, and means for forcibly injecting said mixture into the combustion chamber whereby the heat units are caused to pass out beyond said baffle for heating purposes while the solid products are caused to pass in a direction opposite to that of the course of the gases into said cooling chamber.

In testimony whereof I affix my signature.

TSUNEICHI FUJIYAMA.